(12) United States Patent
Hays et al.

(10) Patent No.: US 8,695,440 B2
(45) Date of Patent: *Apr. 15, 2014

(54) METHOD AND APPARATUS FOR DETERMINING AND COMPENSATING FOR A CHANGE IN A DIFFERENTIAL ZERO OFFSET OF A VIBRATING FLOW METER

(75) Inventors: Paul J Hays, Lafayette, CO (US); Joel Weinstein, Boulder, CO (US); Goldino Alves, Superior, CO (US)

(73) Assignee: Micro Motion, Inc., Boulder, CO (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/388,094

(22) PCT Filed: Aug. 12, 2009

(86) PCT No.: PCT/US2009/053538
§ 371 (c)(1),
(2), (4) Date: Jan. 31, 2012

(87) PCT Pub. No.: WO2011/019344
PCT Pub. Date: Feb. 17, 2011

(65) Prior Publication Data
US 2012/0125123 A1 May 24, 2012

(51) Int. Cl.
*G01F 1/84* (2006.01)
(52) U.S. Cl.
USPC .................................................. 73/861.357

(58) Field of Classification Search
USPC ........................... 73/861.355–861.357
See application file for complete search history.

(56) References Cited

U.S. PATENT DOCUMENTS

| | | | |
|---|---|---|---|
| 5,773,727 A | 6/1998 | Kishiro et al. | |
| 6,917,887 B2* | 7/2005 | Henry et al. | 702/45 |
| 6,981,424 B2* | 1/2006 | Henry et al. | 73/861.356 |
| 7,275,007 B2 | 9/2007 | Lesjak | |
| 2003/0109939 A1 | 6/2003 | Burgdorf et al. | |
| 2004/0200259 A1 | 10/2004 | Mattar | |
| 2005/0119845 A1 | 6/2005 | Lesjak | |
| 2012/0125124 A1* | 5/2012 | Hays et al. | 73/861.357 |

FOREIGN PATENT DOCUMENTS

| | | |
|---|---|---|
| JP | 2005134401 | 5/2005 |
| JP | 2007163203 | 6/2007 |
| RU | 1840667 A1 | 9/2008 |
| WO | 02097379 A1 | 12/2002 |
| WO | 2006073388 A1 | 7/2006 |
| WO | 2009017494 A1 | 2/2009 |

* cited by examiner

*Primary Examiner* — Jewel V Thompson
(74) *Attorney, Agent, or Firm* — The Ollila Law Group LLC

(57) ABSTRACT

A method for operating a vibrating flow meter system is provided. The method includes the step of receiving a first sensor signal from a first vibrating flow meter. A second sensor signal is received from a second vibrating flow meter. A first flow rate is generated from the first sensor signal and a second flow rate is generated from the second sensor signal. The method further includes the step of determining a differential zero offset of the first vibrating flow meter based on the first and second flow rates.

18 Claims, 7 Drawing Sheets

METHOD AND APPARATUS FOR DETERMINING AND COMPENSATING FOR A CHANGE IN A DIFFERENTIAL ZERO OFFSET OF A VIBRATING FLOW METER

TECHNICAL FIELD

The present invention relates to, vibrating flow meters, and more particularly, to a method and apparatus for determining and compensating for a change in a differential zero offset of a vibrating flow meter.

BACKGROUND OF THE INVENTION

Vibrating sensors, such as for example, vibrating densitometers and Coriolis flow meters are generally known and are used to measure mass flow and other information for materials flowing through a conduit in the flow meter. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or a small "zero offset", which is a time delay measured at zero flow. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the time delay between the pick-off sensors. The time delay between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well known arrangements; however, a magnet and an opposing drive coil have received great success in the flow meter industry. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current which induces a motion, the pick-off sensors can use the motion provided by the driver to induce a voltage. The magnitude of the time delay measured by the pick-off sensors is very small; often measured in nanoseconds. Therefore, it is necessary to have the transducer output be very accurate.

Generally, a Coriolis flow meter can be initially calibrated and a flow calibration factor along with a zero offset can be generated. In use, the flow calibration factor can be multiplied by the time delay measured by the pick-off sensors minus the zero offset to generate a mass flow rate. In most situations, the Coriolis flow meter is initially calibrated, typically by the manufacturer, and assumed to provide accurate measurements without subsequent calibrations required. In addition, a prior art approach involves a user zero calibrating the flow meter after installation by stopping flow, closing valves, and therefore providing the meter a zero flow rate reference at process conditions.

As mentioned above, in many vibrating sensors, including Coriolis flow meters, a zero offset may be present, which prior art approaches initially correct for. Although this initially determined zero offset can adequately correct the measurements in limited circumstances, the zero offset may change over time due to a change in a variety of operating conditions, mainly temperature, resulting in only partial corrections. However, other operating conditions may also affect the zero offset, including pressure, fluid density, sensor mounting conditions, etc. Furthermore, the zero offset may change at a different rate from one meter to another. This may be of particular interest in situations where more than one meter is connected in series such that each of the meters should read the same if the same fluid flow is being measured.

Therefore, there is a need in the art for a method to determine and compensate for a change in the zero offset of a vibrating sensor. The present invention overcomes this and other problems and an advance in the art is achieved.

SUMMARY OF THE INVENTION

A method for operating a vibrating flow meter system is provided according to an embodiment of the invention. The method comprises the steps of receiving a first sensor signal from a first vibrating flow meter and a second sensor signal from a second vibrating flow meter. The method further comprises the step of generating a first flow rate from the first sensor signal and generating a second flow rate from the second sensor signal. According to an embodiment of the invention, the method also comprises determining a differential zero offset of the first vibrating flow meter based on the first and second flow rates.

A method of operating a vibrating flow meter system having a previously determined offset correlation is provided according to another embodiment of the invention. The method comprises the step of receiving a first sensor signal from a first vibrating flow meter. The method also includes the step of determining one or more current operating conditions of the vibrating flow meter. The method also comprises the step of comparing the one or more current operating conditions to one or more previous operating conditions of the offset correlation. A current differential zero offset is then determined for the first vibrating flow meter based on the one or more current operating conditions and the previously determined offset correlation.

A meter electronics for a vibrating flow meter system including a first vibrating flow meter, a second vibrating flow meter, and a processing system is provided according to an embodiment of the invention. The processing system can be configured to receive a first sensor signal from the first vibrating flow meter and receive a second sensor signal from the second vibrating flow meter. According to an embodiment of the invention, the processing system may also be configured to generate a first flow rate from the first sensor signal and generate a second flow rate from the second sensor signal. The processing system may also be configured to determine a differential zero offset for the first vibrating flow meter based on the first and second flow rates.

A meter electronics for a vibrating flow meter system having a previously determined offset correlation between a differential zero offset and one or more operating conditions, including a first vibrating flow meter, a second vibrating flow meter, and a processing system is provided according to an embodiment of the invention. The processing system can be configured to receive a first sensor signal from the first vibrating flow meter. The processing system may also be configured to determine one or more current operating conditions of the vibrating flow meter. According to an embodiment of the invention, the processing system may also be configured to compare the one or more current operating conditions to one or more previous operating conditions of the offset correlation. The processing system may be further configured to determine a current differential zero offset of the first vibrating flow meter based on the one or more current operating conditions and the previously determined offset correlation.

ASPECTS

According to an aspect of the invention, a method for operating a vibrating flow meter system comprises the steps of:
  receiving a first sensor signal from a first vibrating flow meter and at least a second sensor signal from a second vibrating flow meter;
  generating a first flow rate from the first sensor signal and generating a second flow rate from the second sensor signal; and
  determining a differential zero offset of the first vibrating flow meter based on the first and second flow rates.
Preferably, the method further comprises the steps of:
  receiving a subsequent first sensor signal from the first vibrating flow meter; and
  generating a compensated flow rate using the subsequently received first sensor signal and the determined differential zero offset.
Preferably, the method further comprises the steps of:
  determining one or more operating conditions of the first vibrating flow meter; and
  generating a correlation between the differential zero offset and the one or more operating conditions of the first vibrating flow meter.
Preferably, the method further comprises the steps of:
  receiving a subsequent first sensor signal from the first vibrating flow meter; and
  determining a third flow rate using the generated correlation between the differential zero offset and the one or more operating conditions.
Preferably, the step of receiving the first and second sensor signals comprises receiving the first and second sensor signals from the first and second vibrating flow meters at a first flow rate, and wherein the method further comprises the steps of:
  determining a first time delay based on the first sensor signal received from the first vibrating flow meter at the first flow rate;
  receiving subsequent first and second sensor signals from the first and second vibrating flow meter at a second flow rate;
  determining a second time delay based on the subsequent first sensor signal received from the first vibrating flow meter at the second flow rate;
  determining the first and a second flow rate based on the second and subsequent second sensor signals received from the second vibrating flow meter; and
  determining a flow calibration factor for the first vibrating flow meter based on the determined first and second flow rates, the first and second time delays, and the differential zero offset.
Preferably, the method further comprises the steps of:
  determining a fluid density; and
  generating a correlation between the differential zero offset, one or more operating conditions, and the fluid density.

According to another aspect of the invention, a method of operating a vibrating flow meter system having a previously determined offset correlation between a differential zero offset and one or more operating conditions comprises the steps of:
  receiving a first sensor signal from at least a first vibrating flow meter;
  determining one or more current operating conditions of the first vibrating flow meter;
  comparing the one or more current operating conditions to one or more previous operating conditions of the offset correlation; and
  determining a current differential zero offset for the first vibrating flow meter based on the one or more current operating conditions and the previously determined offset correlation.
Preferably, the method further comprises the step of:
  determining a compensated flow rate based on the first sensor signal and the current differential zero offset.
Preferably, the previously determined correlation comprises a correlation between the zero offset and one or more operating conditions for one or more fluid densities.

According to another aspect of the invention, a meter electronics for a vibrating flow meter system, includes a first vibrating flow meter, a second vibrating flow meter, and a processing system configured to:
  receive a first sensor signal from the first vibrating flow meter and a second sensor signal from the second vibrating flow meter;
  generate a first flow rate from the first sensor signal and generate a second flow rate from the second sensor signal; and
  determine a differential zero offset for the first vibrating flow meter based on the first and second flow rates.
Preferably, the processing system is further configured to:
  receive a subsequent first sensor signal from the first vibrating flow meter; and
  generate a compensated flow rate using the subsequently received first sensor signal and the determined differential zero offset.
Preferably, the processing system is further configured to:
  determine one or more operating conditions of the first vibrating flow meter; and
  generate a correlation between the differential zero offset and the one or more operating conditions of the first vibrating flow meter.
Preferably, the processing system is further configured to:
  receive a subsequent first sensor signal from the first vibrating flow meter; and
  determine a third flow rate using the generated correlation between the differential zero offset and the one or more operating conditions.
Preferably, the first and second sensor signals are received at a first flow rate and wherein the processing system is further configured to:
  determine a first time delay based on the first sensor signals received from the first vibrating flow meter at the first flow rate;

receive subsequent first and second sensor signals from the first and second vibrating flow meters at a second flow rate;

determine a second time delay based on the subsequently received first sensor signals received from the first vibrating flow meter at the second flow rate;

determine the first and second flow rates based on the second and subsequently received second sensor signals received from the second vibrating flow meter; and determine a flow calibration factor for the first vibrating flow meter based on the determined first and second flow rates, the first and second time delays, and the differential zero offset.

Preferably, the processing system is further configured to:
determine a fluid density; and
generate a correlation between the differential zero offset, one or more operating conditions, and the fluid density.

According to another aspect of the invention, a meter electronics for a vibrating flow meter system having a previously determined offset correlation between a differential zero offset and one or more operating conditions, the vibrating system including a first vibrating flow meter, a second vibrating flow meter, and a processing system configured to:

receive a first sensor signal from the first vibrating flow meter;

determine one or more current operating conditions of the first vibrating flow meter;

compare the one or more current operating conditions to one or more previous operating conditions of the offset correlation; and determine a current differential zero offset for the first vibrating flow meter based on the one or more current operating conditions and the previously determined offset correlation.

Preferably, the processing system is further configured to:
determine a compensated flow rate based on the first sensor signal and the current differential zero offset.

Preferably, the previously determined correlation comprises a correlation between the zero offset and one or more operating conditions for one or more fluid densities.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
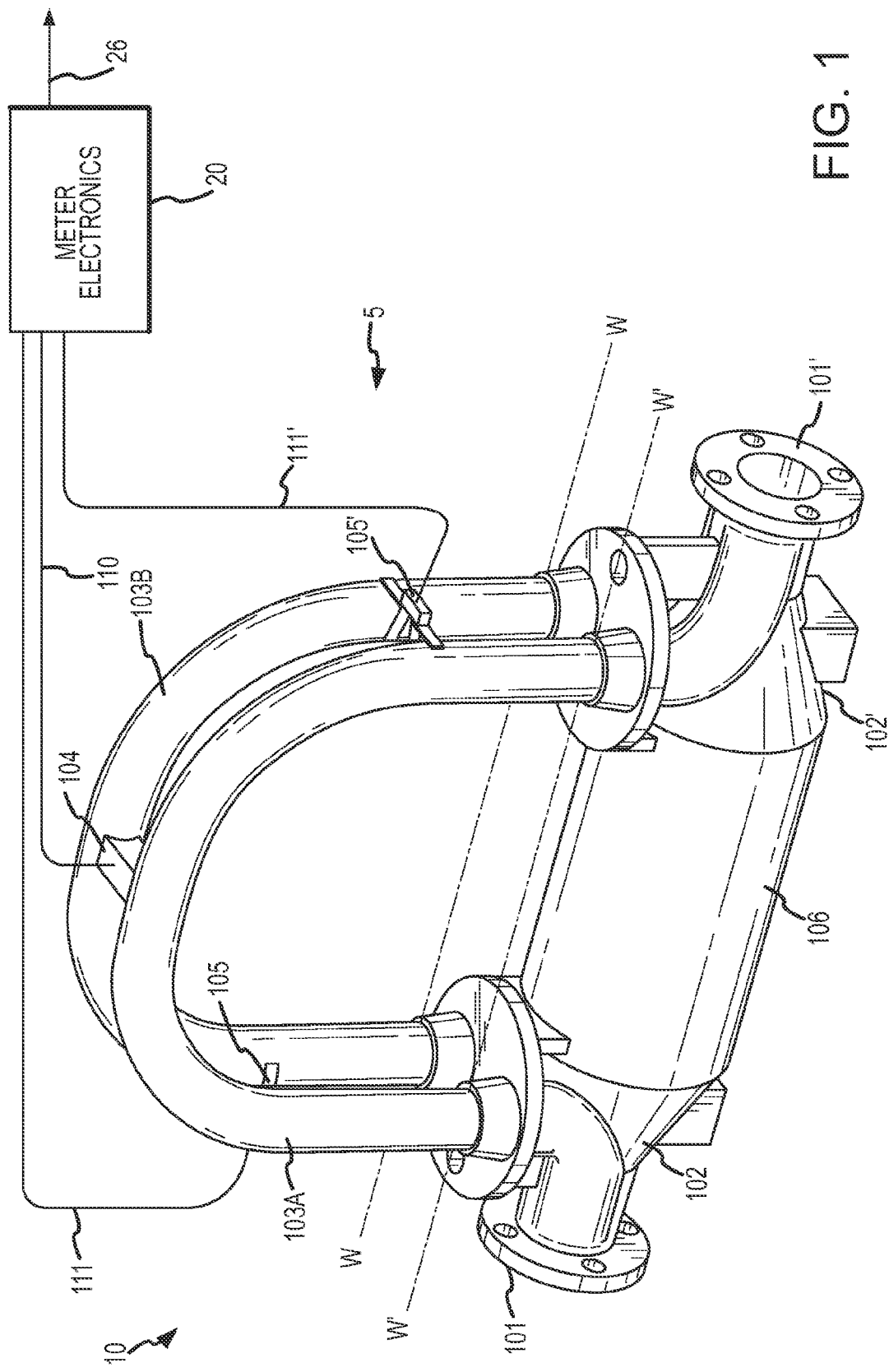
FIG. 1 shows a vibrating sensor assembly according to an embodiment of the invention.

FIG. 1 illustrates an example of a vibrating sensor assembly 5 in the form of a Coriolis flow meter comprising a flow meter 10 and one or more meter electronics 20. The one or more meter electronics 20 are connected to flow meter 10 to measure a characteristic of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits 103A and 103B extend outwardly from the manifolds in an essentially parallel fashion. When the flow meter 10 is inserted into a pipeline system (not shown) which carries the flowing material, the material enters flow meter 10 through flange 101, passes through inlet manifold 102 where the total amount of material is directed to enter conduits 103A and 103B, flows through conduits 103A and 103B and back into outlet manifold 102' where it exits the flow meter 10 through the flange 101'.

The flow meter 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via pathway 110, and passed through the coil to cause both conduits 103A, 103B to oscillate. Those of ordinary skill in the art will appreciate that other drive modes may be used within the scope of the present invention.

The flow meter 10 shown includes a pair of pick-offs 105, 105' that are affixed to conduits 103A, 103B. More particularly, a first pick-off component (not shown) is located on conduit 103A and a second pick-off component (not shown) is located on conduit 103B. In the embodiment depicted, the pick-offs 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the flow meter 10 described above comprises a dual flow conduit flow meter, it is well within the scope of the present invention to implement a single conduit flow meter. Furthermore, while the flow conduits 103A, 103B are shown as comprising a curved flow conduit configuration, the present invention may be implemented with a flow meter comprising a straight flow conduit configuration. Therefore, the particular embodiment of the flow meter 10 described above is merely one example and should in no way limit the scope of the present invention.

In the example shown in FIG. 1, the one or more meter electronics 20 receive the pick-off signals from the pick-offs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receive one or more signals, for example, from pick-offs 105, 105' and one or more temperature sensors (not shown), and use this information to measure a characteristic of a flowing material.

The techniques by which vibrating sensor assemblies, such as for example, Coriolis flow meters or densitometers measure a characteristic of a flowing material are well understood; therefore, a detailed discussion is omitted for brevity of this description.

As discussed briefly above, one problem associated with vibrating sensor assemblies, such as Coriolis flow meters, is the presence of a zero offset, which is the measured time delay of the pick-offs 105, 105' at zero fluid flow. If the zero offset is not taken into account in calculating the flow rate and various other flow measurements, the flow measurements will typically include an error in the measurement. The typical prior art approach to compensate for the zero offset is to measure an initial zero offset ($\Delta t_0$) during an initial calibration process, which usually involves closing valves and providing a zero flow reference condition. Such calibration processes are generally known in the art and a detailed discussion is omitted for brevity of the description.

Once an initial zero offset is determined, during operation, flow measurements are corrected by subtracting the initial zero offset from the measured time difference according to equation (1).

$$\dot{m} = FCF(\Delta t_{measured} - \Delta t_0) \quad (1)$$

Where:
$\dot{m}$ = mass flow rate
FCF = Flow calibration factor
$\Delta t_{measured}$ = measured time delay
$\Delta t_0$ = initial zero offset It should be appreciated that equation (1) is merely provided as an example and should in no way limit the scope of the present invention. Although equation (1) is provided to calculate mass flow rate, it should also be appreciated that various other flow measurements may be affected by the zero offset and therefore, may also be corrected.

While this approach can provide satisfactory results in situations where the operating conditions are substantially the same as those present during the initial calibration and determination of the zero offset, $\Delta t_0$, in many circumstances, the operating conditions during use are substantially different from the operating conditions present during calibration. As a result of the change in conditions, the vibrating flow meter can experience a drift in the zero offset. In other words, the zero offset can change from the initially calculated zero offset, $\Delta t_0$. The drift in the zero offset can seriously affect the sensor's performance resulting in inaccurate measurements. This is because in the prior art, the zero offset used to compensate the measured time difference during operation simply comprised the initially calculated zero offset without accounting for a change in the zero offset. Other prior art approaches required manually recalibrating the sensor. Typically, recalibration requires stopping flow through the sensor to re-zero the sensor. This can be costly as the entire system generally must be shut down. Also, when flow is stopped to perform a prior art zero calibration, the temperature of the meter can change rapidly if the ambient temperature is different than the fluid temperature. This can cause an unreliable zero calibration.

According to an embodiment of the invention, the meter electronics 20 can be configured to generate a correlation between a zero offset and one or more operating conditions. According to an embodiment of the invention, the meter electronics 20 can be configured to compensate for a drift in the zero offset. According to an embodiment of the invention, the meter electronics 20 can compensate for a drift in the zero offset based on the correlation between a zero offset and one or more measurable operating conditions. According to one embodiment of the invention, the zero offset comprises an absolute zero offset. According to another embodiment of the invention, the zero offset comprises a differential zero offset. The differential zero offset comprises an initial zero offset of a sensor combined with a differential error between two or more sensors. The differential zero offset may be required in order to generate substantially equal flow rates through the sensor of interest and a reference sensor. In other words, referring to equation (1) above, if the same fluid flow rate flows through a sensor being calibrated and a reference sensor, the two sensors can generate two mass flow rates using equation (1) for each sensor. If we assume the reference sensor's mass flow rate is equal to the mass flow rate of the meter being calibrated, then the differential zero offset of the sensor being calibrated can be calculated. This method finds a new zero offset for the sensor being calibrated to reflect the reference flow rate. This new zero offset is essentially a differential offset. This is shown in equations (2 and 3).

$$\dot{m}_R = \dot{m}_c = FCF_C[\Delta t_c - (\Delta t_{0c} + \Delta t_E)] \quad (2)$$

$$(\Delta t_{0C} + \Delta t_E) = \Delta t_c - \frac{\dot{m}_R}{FCF_c} \quad (3)$$

Where:
$\dot{m}_R$ = reference mass flow rate
$\Delta t_{0C}$ = initial zero offset of the sensor being calibrated
$\Delta t_E$ = differential error
$\Delta t_c$ = measured time delay of the sensor being calibrated
$FCF_C$ = flow calibration factor of the sensor being calibrated Equation (3) can be further reduced by combining the zero offset of the sensor being calibrated and the differential error. The result is an equation that defines the differential zero offset, which is shown in equation (4).

$$(\Delta t_D) = \Delta t_c - \frac{\dot{m}_R}{FCF_c} \quad (4)$$

Where $\Delta t_D$=differential zero offset

Therefore, the differential zero offset of the sensor of interest is not an absolute zero offset in the sense that it is referenced to zero flow rate, but rather, the zero offset comprises a differential zero offset in that it accounts for a difference between the two sensors. When this differential offset is characterized and eliminated, the differential measurement performance of the sensor pair is greatly improved. It may be necessary to characterize the differential offset with a change in operating conditions. It should be appreciated that equation (4) could be further reduced in any number of ways by assuming certain values remain constant, such as the flow calibration factors or the initial zero offset values. Therefore, the particular form of equation (4) should not limit the scope of the present invention.

In either embodiment, the present invention can compensate for a drift in the zero offset without stopping flow through the sensor. Advantageously, the present invention can determine and compensate for a drift in the zero offset while operating the sensor during normal use.

Figure 2:
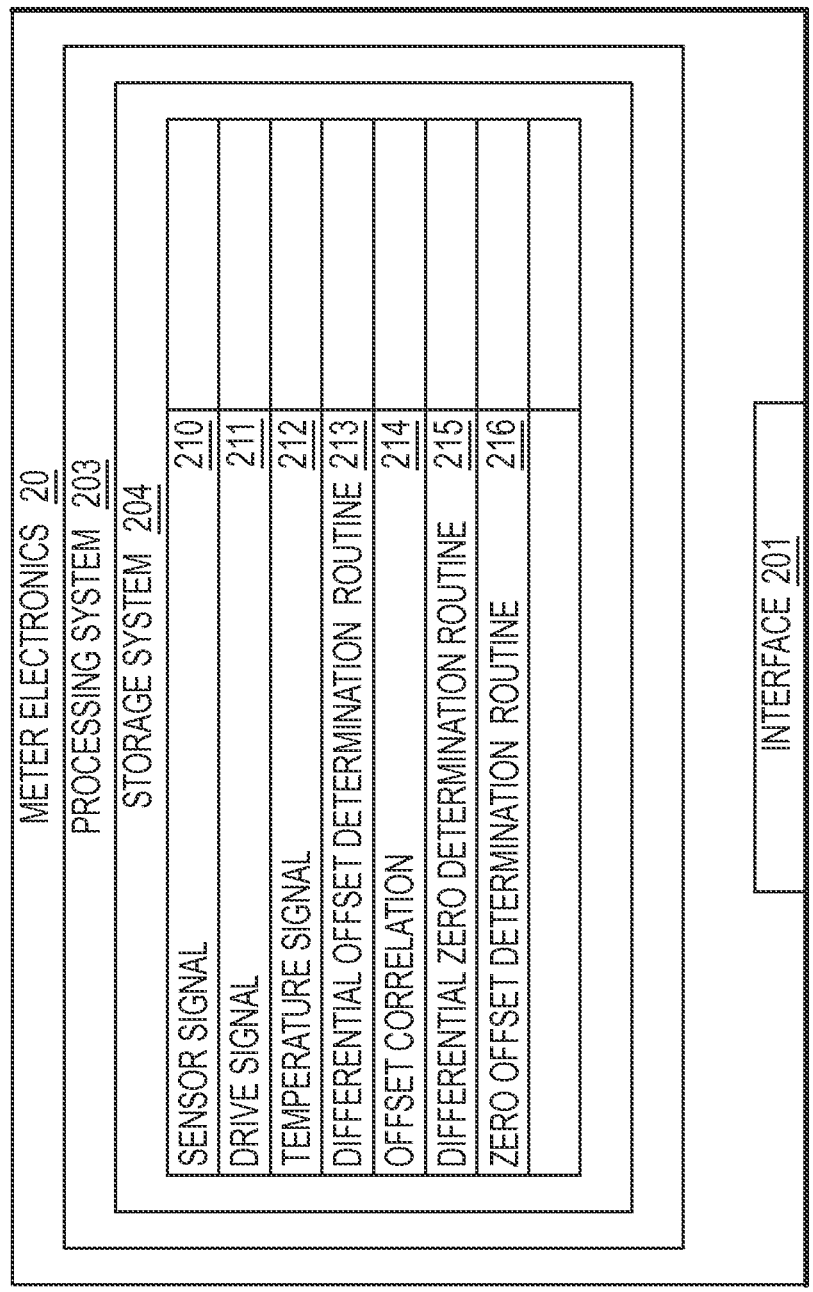
FIG. 2 shows a meter electronics for a vibrating sensor according to an embodiment of the invention.

FIG. 2 shows the meter electronics 20 according to an embodiment of the invention. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104. In addition, the meter electronics 20 can receive sensor signals 210 from the flow meter 10 and/or the flow meter 305 shown below, such as pick-off/velocity sensor signals. In some embodiments, the sensor signals 210 can be received from the driver 104. The meter electronics 20 can operate as a densitometer or can operate as a mass flow meter, including operating as a Coriolis flow meter. It should be appreciated that the meter electronics 20 may also operate as some other type of vibrating sensor assembly and the particular examples provided should not limit the scope of the present invention. The meter electronics 20 can process the sensor signals 210 in order to obtain flow characteristics of the material flowing through the flow conduits 103A, 103B. In some embodiments, the meter electronics 20 may receive a temperature signal 212 from one or more RTD sensors or other temperature measuring devices, for example.

The interface 201 can receive the sensor signals 210 from the driver 104 or pick-off sensors 105, 105', via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer (not shown), wherein the sensor signal comprises an analog sensor signal. The digitizer can sample and digitize the analog sensor signal and produce a digital sensor signal. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the flow meter 10. The processing system 203 can execute one or more processing routines, such as the differential offset determination routine 213, the differential zero determination routine 215, and the zero offset determination routine 216, and thereby process the flow measurements in order to produce one or more flow characteristics that are compensated for a drift in the zero offset of the sensor.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate the drive signal 211, among other things. The drive signal 211 is supplied to the driver 104 in order to vibrate the associated flow tube(s), such as the flow tubes 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As the processing system 203 generates the various flow characteristics, such as for example, the mass flow rate or volume flow rate, an error may be associated with the generated flow rate due to the zero offset of the vibrating flow meter, and more particularly, a change or a drift in zero offset of the vibrating flow meter. Although the zero offset is typically initially calculated as described above, the zero offset can drift away from this initially calculated value due to a number of factors including a change in one or more operating conditions, such as the temperature of the vibrating flow meter. The change in temperature may be due to a change in the fluid temperature, the ambient temperature, or both. The change in temperature may be a change from a reference or calibration temperature $T_0$ of the sensor during the determination of the initial zero offset. The change in temperature may be attributable to a change in the sensor's temperature, a change in the meter electronics temperature, or both. According to an embodiment of the invention, the meter electronics 20 can implement a differential offset determination routine 213 as described further below.

Although the present invention has been described above in relation to a single vibrating flow meter, there are many applications that utilize multiple vibrating flow meters in series. In many of these applications, the absolute flow rate measured by each individual flow meter is not of interest, but rather the difference in the flow rates measured by the various flow meters is of interest. Two common examples of such a situation are in the application of fuel efficiency measurements and leak detection measurements. A fuel efficiency application is shown in FIG. 3; however, the figure is equally applicable to other situations, such as leak detection systems, where multiple flow meters are implemented in series and the difference in measurements between at least two flow meters is of interest.

Figure 3:
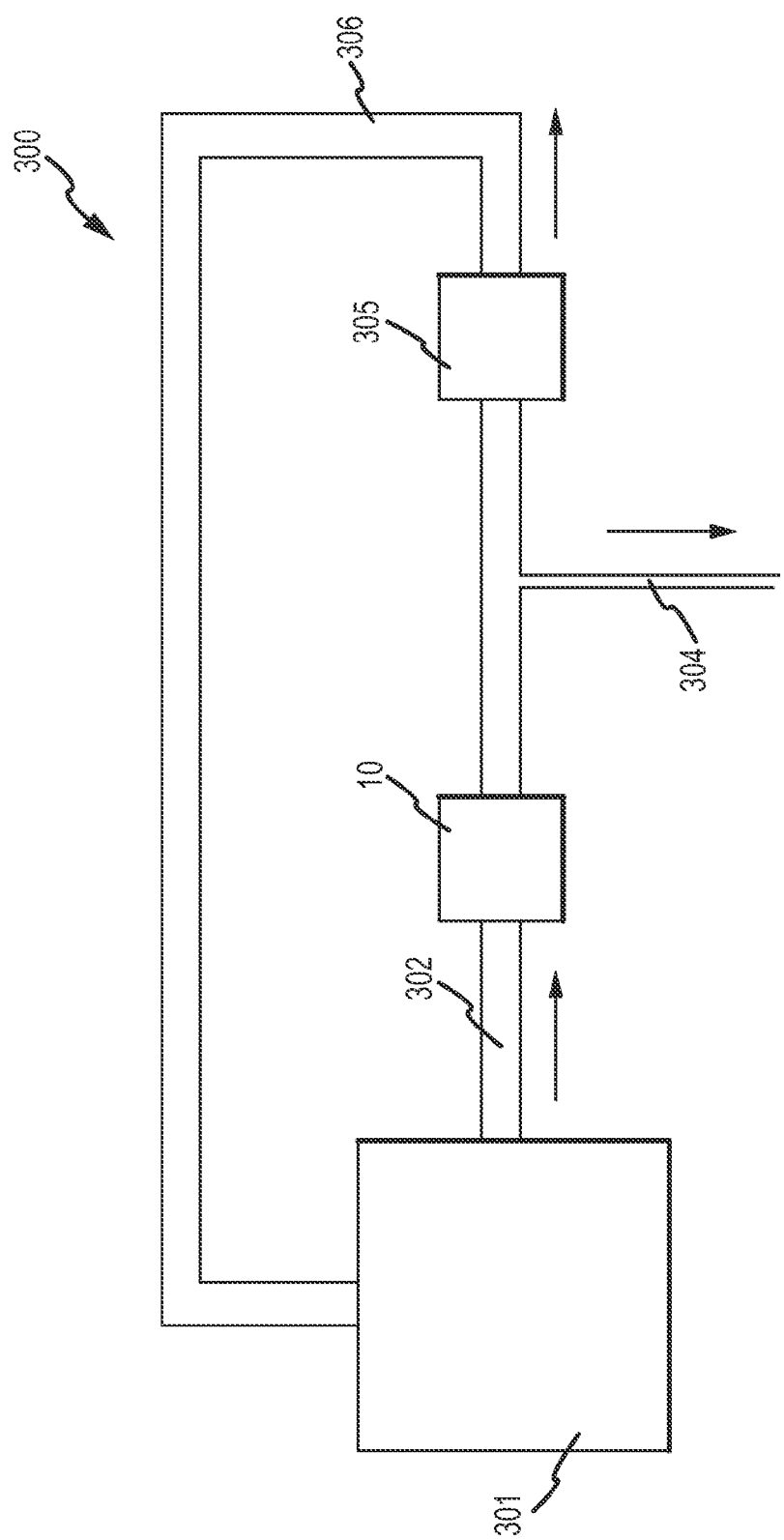
FIG. 3 shows a block diagram of a flow meter system according to an embodiment of the invention.

FIG. 3 shows a block diagram of a flow meter system 300 according to an embodiment of the invention. Although the flow meter system 300 is shown as a typical fuel efficiency system, it should be appreciated that fuel is merely one example and the system 300 is equally applicable to other fluids. Therefore, the use of fuel should not limit the scope of the present invention. The flow meter system 300 includes a fuel supply 301, a fuel supply conduit 302, a first vibrating flow meter 10 positioned in the fuel supply conduit 302, a fuel outlet 304, a fuel return conduit 306, and a second vibrating flow meter 305 positioned in the fuel return conduit 306. Typically, an engine or other fuel consuming device would be positioned between the first and second flow meters 10, 305; however the device has been omitted from the figure to reduce the complexity of the drawing. Although not shown, it should be appreciated that the flow meters 10, 305 will typically be connected to one or more meter electronics, as discussed above. In some embodiments, the first and second flow meters 10, 305 may be connected to the same meter electronics. According to an embodiment of the invention, the first and second flow meters 10, 305 comprise Coriolis flow meters. However, the flow meters may comprise other types of vibrating sensors that lack the measurement capabilities of Coriolis flow meters. Therefore, the present invention should not be limited to Coriolis flow meters.

In use, a fluid, such as fuel, can be supplied to the first flow meter 10 via the fluid supply conduit 302. The first flow meter 10 can calculate various fluid parameters, including a fluid flow rate, as discussed above. The fuel then exits the first flow meter 10 and flows through the fuel consuming device and to either the fuel outlet 304 or the second flow meter 305. If fuel is being drawn from the fuel outlet 304, such as for example, if an engine is running and consuming fuel, then only a portion of the fuel exiting the first vibrating flow meter 10 will flow to the second vibrating flow meter 305. Therefore, the flow rates measured by the first and second vibrating flow meters 10, 305 will be different. The unused fuel flows through the second vibrating flow meter 305 and can return to the fuel supply 301 as shown. It should be appreciated that while the fuel efficiency system 300 only shows one fuel outlet 304 and two vibrating flow meters 10, 305, in some embodiments, there will be multiple fuel outlets and therefore, more than two vibrating flow meters.

According to an embodiment of the invention, the difference in flow rates measured by the first and second flow meters 10, 305 is substantially equal to the flow rate of the fuel exiting the fluid outlet 304, i.e., being consumed by the engine. Therefore, the difference in the measured flow rates between the two flow meters 10, 305 is the value of interest in most applications similar to the configuration shown in FIG. 3. As a result, one meter can be set as a reference meter and the other meter can be calibrated to match the reference meter when the flow rate is supposed to be the same, i.e., no fluid is exiting the fuel outlet 304. In most embodiments it will not matter which meter is set as the reference meter.

The flow rate of the fuel exiting the fuel outlet 304 (fluid consumption) is typically much smaller than the flow rate in the supply and return conduits 302, 306, leading to oversized sensors. There is also a desire in these configurations to size the flow meters such that there is very little pressure drop, which means relatively low flow rates for the meter's size. With such low flow rates for the meter's size, the time delay between the pick-offs will also be relatively small. With the measured time delay so close to the zero offset, the zero offset of the flow meter can seriously affect the meter's accuracy. It can easily be appreciated that because of the increased sensitivity to the zero offset in the system 300, that even a small drift in the zero offset can adversely affect the entire system. However, because the difference in the measurements is the value of interest, the absolute zero offset of the individual flow meters 10, 305 is not needed to correct the measurement. Rather, the initially calibrated zero offset of one meter can be used and a differential zero offset, as defined above, can be calculated for the second meter. By way of example, the second flow meter 305 can be referenced against the first flow meter 10. Therefore, in embodiments where the zero offset comprises a differential zero offset, one of the flow meters is considered a reference flow meter with the zero offset of the other flow meter calibrated to match the reference meter. Therefore, the differential zero offset can be calculated using equation (4).

Advantageously, compensating for a differential zero offset between two or more meters not only compensates for operating condition-based zero differences, but also removes the absolute zero offset differences between the meters due to installation effects, for example. Furthermore, the differential zero offset does not necessarily need to be determined when the flow rate through the flow meter is zero so long as the fluid flowing through the flow meter of interest and the reference flow meter has substantially the same fluid flow rate. Therefore, the differential zero offset can be determined whenever the engine is off, for example. This assumes however, that any difference between the measured flow rates is due to a change in the zero offset and not attributable to other factors, such as a change in the flow calibration factor. In many applications, it is relatively easy to determine if the engine is running as the fuel consumption is typically more than 5 times greater than the differential zero offset. Therefore, it is unlikely that the difference between measurements of the first and second flow meters 10, 305 due to fuel consumption would be mistaken for a differential zero offset. According to an embodiment of the invention, the differential offset determination routine 213 can be implemented to determine a zero offset correlation 214. While the discussion below refers to the zero offset correlation 214 as comprising a correlation for a differential zero offset, it should be appreciated that a similar routine could be performed to generate an absolute zero offset correlation. However, such a correlation would require the flow rate through the vibrating flow meter to be zero in order to generate various zero offset values.

Figure 4:
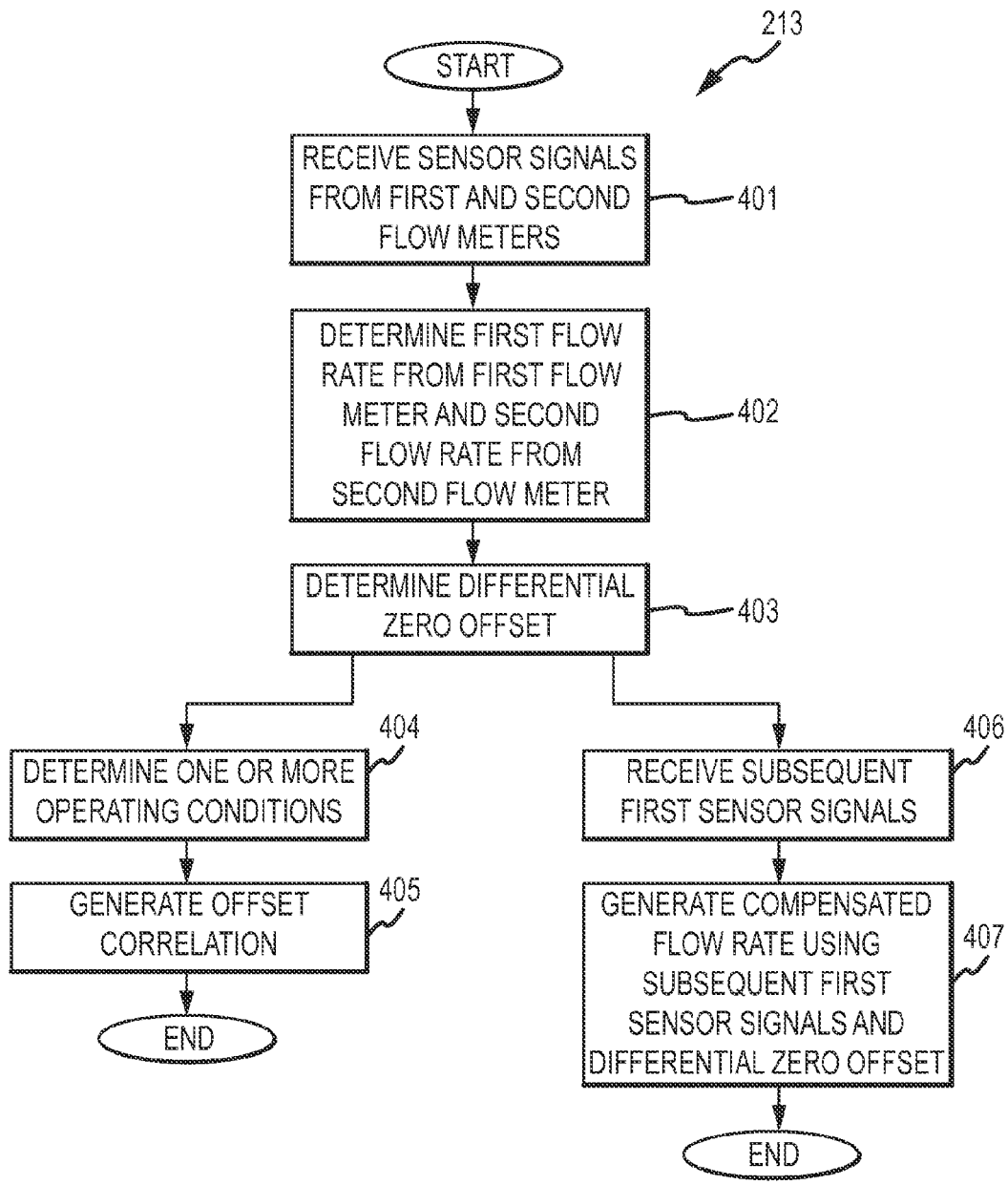
FIG. 4 shows a differential offset determination routine according to an embodiment of the invention.

FIG. 4 shows the differential offset determination routine 213 according to an embodiment of the invention. According to an embodiment of the invention, the meter electronics 20 may be configured to perform the differential offset determination routine 213, for example. The differential offset determination routine 213 may be performed by the manufacturer or by a user after the sensor has been installed.

According to embodiments when the differential offset determination routine 213 is implemented with multiple flow meters such as shown in FIG. 3, the routine 213 may be implemented when the flow rate through the two or more flow meters is substantially the same, including a fluid flow rate of zero. The differential offset determination routine 213 may be performed to calibrate a differential zero offset between two or more flow meters. Therefore, the differential offset determination routine 213 may not necessarily calibrate the flow meters to read an accurate absolute mass flow rate; but rather, the flow meters can be calibrated such that the differential reading between the two is accurate. By way of example, if the true flow rate through the first flow meter 10, as determined by a prover or similar device, is 2000 kg/hour and the flow rate of the fluid exiting through the outlet 304 comprises 1000 kg/hour, then it is desirable to have the difference between the second flow meter 305 and the first flow meter 10 equal 1000 kg/hour. However, in many embodiments it may be acceptable if the first flow meter 10 measures a flow rate of 2020 kg/hour so long as the second flow meter 305 is calibrated to read 1020 kg/hour. Therefore, while the absolute flow rate through each meter may not be accurate, the differential reading is accurate or at least within an acceptable error range. It should be appreciated that the above mentioned values are merely examples and should in no way limit the scope of the present invention.

The differential offset determination routine 213 can be performed when the fluid consuming device, such as an engine, is off. In other embodiments, the differential offset determination routine 213 can be performed when the flow rates measured by the first flow meter 10 and the second flow meter 305 are expected to comprise the same measurement, such as if it is determined that the leak detection system does not have a leak. Therefore, it should be appreciated that the flow through the flow meters 10, 305 does not necessarily comprise zero flow and in many embodiments will not comprise zero flow during the differential offset determination routine 213.

According to an embodiment of the invention, the differential offset determination routine 213 may be performed after an initial calibration of the vibrating flow meter or may comprise part of the initial calibration of the vibrating flow meter. The differential offset determination routine 213 may be used to generate a correlation between a zero offset of a vibrating flow meter and one or more operating conditions of the vibrating flow meter. The zero offset may comprise an absolute zero offset or a differential zero offset as described above.

The differential offset determination routine 213 begins in step 401 where one or more sensor signals can be received from the first vibrating flow meter 10 and the second vibrating flow meter 305. The sensor signals may be received by pick-off sensors, such as the pick-off sensors 105, 105' of the first vibrating flow meter 10, for example. Because there are multiple vibrating flow meters, such as in FIG. 3, the sensor signals may be received from both flow meters when there is fluid flowing through the flow meters.

In step 402, the received sensor signals may be processed to determine a first flow rate as determined by the first vibrating flow meter 10 and a second flow rate as determined by the second vibrating flow meter 305. The first and second flow rates can be determined using equation (1), for example.

In step 403, a differential zero offset of the first vibrating flow meter 10 can be determined. According to an embodiment of the invention, the differential zero offset can be determined using equation (4), for example. According to an embodiment of the invention, the determined zero offset may comprise the initially determined zero offset. This may be the case if the zero offset determination routine 213 is implemented as part of the initial calibration of the vibrating flow meter, for example. According to another embodiment of the invention, the determined zero offset may comprise a subsequently determined zero offset. The subsequently determined zero offset may be different than the initially determined zero offset. This may be the case especially in situations where the operating conditions are different from the operating conditions when the initial zero offset was determined, for example. In some embodiments, the routine 213 may end after step 403. According to another embodiment, the routine 213 may continue on to either step 404 or step 406.

In step 404, one or more current operating conditions can be determined. The one or more current operating conditions may be determined by processing the sensor signals received in step 401. Alternatively, the one or more operating conditions may be determined from external inputs such as external temperature sensors, viscometer, etc. The operating conditions may comprise one or more of a temperature, a pressure, a fluid density, a sensor mounting condition, a drive gain, etc. According to one embodiment, the drive gain can be compared to a threshold value and if the drive gain exceeds the threshold value, the zero offset determined in step 402 can be considered an error and not stored. The error may be attributable to entrained gas, for example. If one of the operating conditions comprises a temperature, the temperature may be determined using an RTD, for example. The temperature may correspond to a flow meter temperature or a meter electronics temperature, for example. According to an embodiment of the invention, the temperature is assumed to be substantially the same between the first flow meter 10 and the second flow meter 305. According to another embodiment of the invention, it is assumed that the difference in temperature between the first flow meter 10 and the second flow meter 305 remains substantially constant.

In step 405, an offset correlation 214 can be generated between the differential zero offset and one or more operating conditions. It should be appreciated that while the correlation can be improved by repeating the differential offset determination routine 213 multiple times at various operating conditions, a correlation 214 may be generated from a single determined differential zero offset along with the corresponding operating conditions. This is especially true in situations where an initially calculated zero offset is available from an initial calibration, for example. However, it can easily be appreciated that as more zero offsets are determined at various additional operating conditions, the offset correlation 214 becomes more comprehensive. By way of example, the temperature may be adjusted to a new temperature, which is different from the temperature measured in step 403 and another zero offset can be determined. Alternatively, the zero offset determination routine 213 may be performed whenever the flow rate through the vibrating flow meter is substantially zero or when the flow rate through the first flow meter 10 and the second flow meter 305 are substantially equal. The new zero offset can be stored along with the new temperature in order to add additional values to the offset correlation 214. The offset correlation 214 may be stored for future retrieval by the meter electronics 20. The offset correlation 214 may be stored in a variety of formats including, for example, look-up tables, graphs, equations, etc. Although the discussion above is limited to temperature as comprising the operating condition, other operating conditions may be taken into account other than temperature. According to another embodiment of the invention, the offset correlation 214 may comprise a multi-dimensional correlation. For example, the offset correlation 214 may take into account not only temperature, but also fluid density. Therefore, the zero offset could change with both temperature and fluid density resulting in a three-dimensional correlation. According to another embodiment of the invention, separate zero offset correlations can be generated for each fluid density. For example, if it is expected that two fluids may flow through the system, then a separate correlation may be generated for each of the two fluids. If a third fluid having a different density is subsequently measured, then the corrected zero offset may be obtained by interpolating or extrapolating from the available correlations.

Once an offset correlation 214 between a differential zero offset and one or more operating conditions is determined, a measured operating condition can be compared to a previous operating condition stored in the correlation 214 in order to determine an associated zero offset at the particular operating condition. According to an embodiment of the invention, the corrected zero offset can provide a more accurate determination of the various flow characteristics. For example, a compensated flow rate may be generated based on the differential zero offset. The compensated flow rate may take into account variations in the zero offset due to changes in one or more operating conditions, such as temperature. As mentioned above, the offset correlation 214 may be stored in a variety of formats. An example of a look-up table is shown below in table 1 with a corresponding graph shown in FIG. 5.

TABLE 1

| Temperature (° C.) | Differential zero offset (nsec) |
|---|---|
| 0 | 0 |
| 10 | 20 |
| 20 | 80 |
| 30 | 144 |

According to the embodiment of the invention used in table 1, the initial calibration was performed at 0° C. Therefore, there is no differential zero offset between the first and second flow meters 10, 305 at 0° C. However, as the temperature increases, the differential zero offset between the initially calculated zero offset and the zero offset determined at the new operating condition increases as well. The look-up table 1 can be stored in the storage system 204 of the meter electronics 20 or some other storage system for later retrieval.

Figure 5:
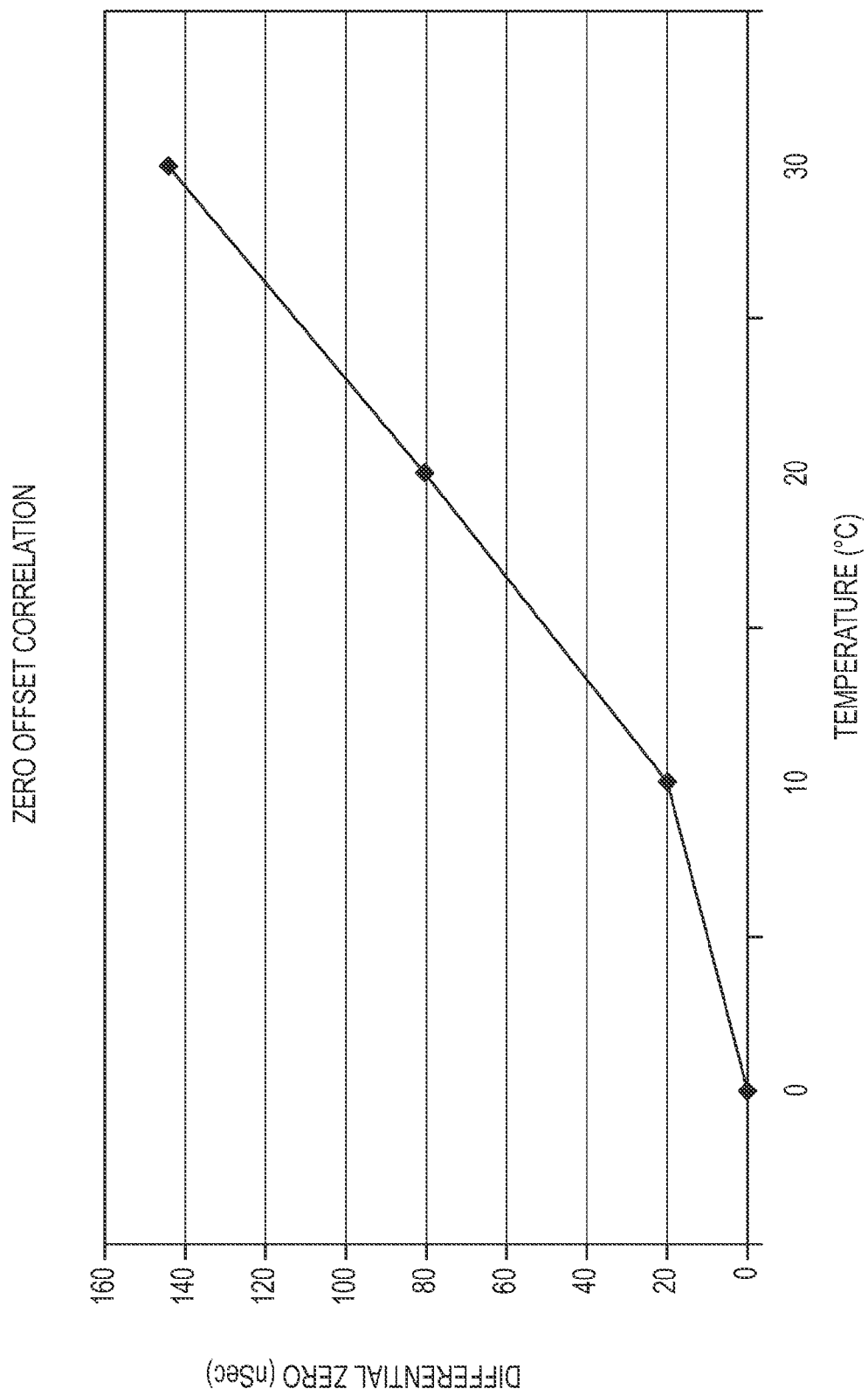
FIG. 5 shows a graph of a differential offset correlation according to an embodiment of the invention.

FIG. 5 shows a graph of a differential zero offset correlation according to an embodiment of the invention. Therefore, temperature comprises the measured operating condition; however, it should be appreciated that any number of other operating conditions may be used to generate similar plots. As can be seen in FIG. 5, the differential zero offset correlation is approximately linear. It should be appreciated that this may not always be the case. The particular correlation may depend on the flow meter in question as well as the fluid density, along with other factors. Furthermore, it should be appreciated that the particular values shown in FIG. 5 are merely examples and should in no way limit the scope of the present invention.

According to an embodiment of the invention, the zero offset correlation 214 determined by routine 213 may be used during normal operations to determine a differential zero offset. More particularly, the zero offset correlation 214 may be used to determine a differential zero offset between a first flow meter 10 and at least a second flow meter 305 based on one or more measured operating conditions. Such a determination is shown in differential zero determination routine 215 shown in FIG. 6.

Figure 6:
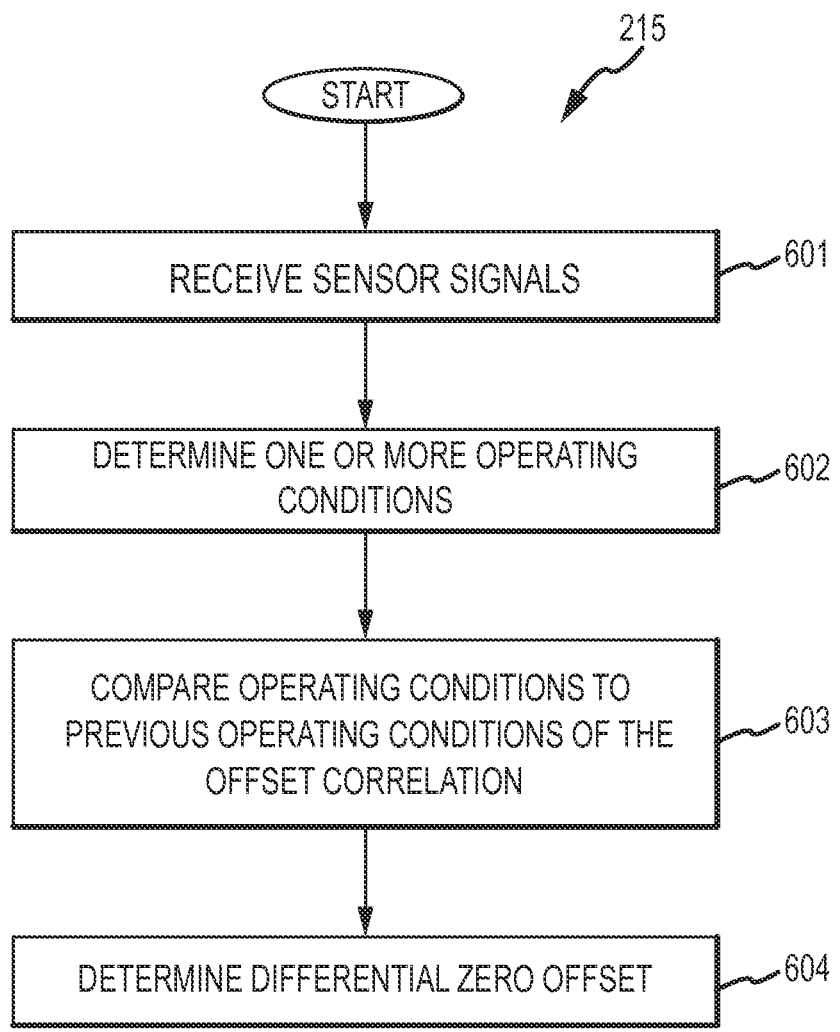
FIG. 6 shows a differential zero determination routine according to an embodiment of the invention.

FIG. 6 shows a differential zero determination routine 215 according to an embodiment of the invention. The differential zero determination routine 215 may be performed during normal operations. The differential zero determination routine 215 may be performed by the meter electronics 20, for example. The differential zero determination routine 215 may be implemented with a vibrating flow meter system as shown in FIG. 3. The differential zero determination routine 215 may be used in order to compensate for a change in a zero offset of a vibrating flow meter. The differential zero determination routine 215 starts in step 601 where sensor signals are received from a vibrating flow meter, such as the vibrating flow meter 10. The vibrating flow meter from which the sensor signals are received comprises a vibrating flow meter having a previously determined offset correlation, such as the offset correlation 214, for example. The sensor signals received in step 601 may be received during normal operation, for example while fluid is flowing through the vibrating flow meter. The sensor signals may comprise a time delay, a phase difference, a frequency, a temperature, etc. The sensor signals may be processed to determine one or more operating conditions in step 602. The one or more current operating conditions may comprise a temperature, a fluid density, a pressure, a drive gain, etc.

In step 603, the one or more operating conditions can be compared to previously determined operating conditions of the offset correlation. The previously determined operating conditions may comprise the same operating conditions as the current operating conditions. According to another embodiment of the invention, the current operating conditions may be compared to two or more previously determined operating conditions.

In step 604, a differential zero offset can be determined based on the offset correlation, for example. The differential zero offset comprises a zero offset that accounts for a change in the zero offset away from an initially determined zero offset due to a variation in one or more operating conditions from the operating conditions when an initial zero offset was determined. The differential zero offset can then be used to generate a compensated flow rate by solving equation (1) using the differential zero offset rather than using the absolute zero offset.

It should be appreciated that in many situations, the exact measured operating condition may not be stored as a correlated value. However, the appropriate zero offset may be interpolated or extrapolated from the known values in the offset correlation 214. For example, if the measured operating condition comprised a temperature of 20° C. and the offset correlation 214 stored had corresponding zero offset values for temperatures of 10° C. and 30° C., the appropriate differential zero offset value could be interpolated from the two available temperatures. Advantageously, a differential zero offset may be generated using the offset correlation 214 and the measured operating conditions. The differential zero offset can be determined without having to re-zero the vibrating flow meter. The differential zero offset can be determined without having to stop the fluid flow. Rather, the differential zero offset can be determined simply by comparing the measured operating conditions to the offset correlation 214. Therefore, the differential zero offset comprises a zero offset that accounts for a drift in the zero offset due to changes in one or more operating conditions.

In some embodiments, the determined operating conditions may be the same or within a threshold difference of the operating conditions that were present during the initial calibration. Therefore, in some embodiments, the measured operating conditions may be compared to the initial calibration operating conditions. If the difference is less than the threshold difference, then the differential zero determination routine 215 may not attempt to retrieve a differential zero offset, but rather may use the initially calibrated zero offset.

According to another embodiment of the invention, it may be desirable to compensate for a change in the zero offset of a vibrating flow meter without having to generate an offset correlation or store a previously generated offset correlation. Furthermore, in some embodiments, while the zero offset of the vibrating flow meters 10, 305 may change significantly from the initially calibrated value, the zero offsets may not change significantly between periods of fuel consumption. In these embodiments, rather than generating a correlation to correct for the changes in the zero offset of the vibrating flow meters, a new differential offset may be determined each time the flow rate through the first and second vibrating flow meter 10, 305 is substantially equal. The newly determined differential offset may be used until another differential offset is determined. This is shown returning to the differential offset determination routine 213 that proceeds from step 403 to step 406 rather than step 404.

In step 406, subsequent first sensor signals are received from the first vibrating flow meter 10. The subsequent first sensor signals may be received after the initial first and second sensor signals. For example, the first and second sensor signals may be received when the flow rate through the first and second vibrating flow meter 10, 305 is substantially the same and the subsequent first sensor signals may be received when the flow rate through the first and second sensor signals are not the same, such as when an engine is running and consuming fuel.

In step 407, a compensated flow rate may be determined based on the subsequently received first sensor signals and the differential zero offset determined in step 403. It should be appreciated that the differential zero offset determined in step 403 may be used until the flow rate through the first and second vibrating flow meter 10, 304 is once again substantially the same and a new differential zero offset can be determined.

The differential offset determination routine 213 advantageously does not need to determine the operating conditions and compare the operating conditions to previous operating conditions of an offset correlation. Rather, the differential zero determination routine 216 assumes that the operating conditions are substantially the same as the operating conditions when the differential zero offset was last determined.

The above discussion has been limited to a discussion of various methods to determine and correct for a change in the zero offset or of one or more vibrating flow meters. Typically, in low flow applications, such as fuel efficiency applications where the sensors are oversized, a change in the zero offset due to a change in the operating conditions accounts for one of the greatest potential errors in the measurement. However, according to an embodiment of the invention, a change or difference in the flow calibration factor of the vibrating flow meter can also be taken into account. While the flow calibration factor is usually more stable with changing operating conditions than the zero offset, it is still advantageous to remove any bias between the two flow meters to optimize differential measurements. Generally, in prior art situations, the flow calibration factor is determined and is assumed to remain substantially constant across a broad range of flow rates and fluid conditions, for example. However, in situations where the value of interest is a difference between measurements of two or more flow meters, even a small change or difference in the flow calibration factor can adversely affect measurements. For example, a change or difference in the flow calibration factor may be experienced as a bias between the first flow meter 10 and the second flow meter 305. By way of example, the first flow meter 10 may measure a mass flow rate of 100 kg/hour while the second flow meter 305 measures a mass flow rate of 101 kg/hour, i.e., there is a 1% bias between the two meters. This bias can be compensated for by the flow calibration factor. If this 1% bias remains regardless of flow rate, then it would be assumed that if the first flow meter 10 measures a mass flow of 1000 kg/hour, the second mass flow rate would measure a mass flow rate 1010 kg/hour. However, a variation away from this 1% bias may be due to a change in the flow calibration factor, assuming other operating conditions remain the same.

According to an embodiment of the invention, two separate tests can be performed at different flow rates with the other operating conditions kept the same. Values for both the flow calibration factor and the zero offset of the sensor can be determined. This can be accomplished using equation (1), for example.

For example, if the present invention is implemented with the fuel efficiency system 300 or a similar system with multiple flow meters in series, one flow meter can be chosen as a reference flow meter, take for example, the second flow meter 305. With the engine off so as to create substantially equal flow rates through the first and second flow meter 10, 305, sensor signals can be received from both the first and second flow meters 10, 305. According to an embodiment of the invention, a mass flow rate can be generated from the second flow meter 305 (reference flow meter) as is generally known in the art. This calculated flow rate can be inserted into equation (1) for the first flow meter 10. Therefore, according to equation (1), two unknowns exist, namely the flow calibration factor of the first flow meter 10 and the zero offset (in this case differential offset). In the embodiments described above, it was assumed that the flow calibration factor had not changed from the initial calibration and therefore, this value was known as well. However, if this assumption is not made, there are two unknowns for one equation. In order to solve for both unknowns, the operating conditions are kept the same except for the mass flow rate, which is adjusted to a different value. With a different mass flow rate, sensor signals are once again received with a mass flow rate being generated by the second flow meter 305. At this point, there are two equations with two unknowns. Both the flow calibration factor and the differential zero offset for the first flow meter 10 can be calculated. If this determination is made at more than one operating condition, correlations can be determined between one or more of the operating conditions and both the flow calibration factor and the differential zero offset. It should be appreciated that in some embodiments, a correlation including flow calibration factor may only be required if the fluid flow rate exceeds a threshold value. According to an embodiment of the invention, the flow calibration factor may be assumed to remain constant if the fluid flow rate remains below the threshold value, for example.

According to the various embodiments described above, only a single zero offset was determined at each measured operating condition. According to an embodiment of the invention, subsequently calculated zero offset values may be determined at already stored operating conditions in order to account for changes in the compensated zero offset that may occur over time. The above mentioned correlation 214 is typically determined during one or more calibration routines. According to another embodiment of the invention, the calibration can be performed automatically and can continuously update the offset correlation 214 to account for changes that may occur over the life of the vibrating flow meter. This allows the present invention to continually adapt to changing conditions. The zero offset determination routine 216 described below may be utilized with a single flow meter, such as shown in FIG. 1, or alternatively, with multiple flow meters, as shown in FIG. 3. Therefore, while the offset correlation 214 described above was primarily concerned with a differential zero offset, the zero offset determination routine 216 may be used to update an absolute zero offset.

Figure 7:
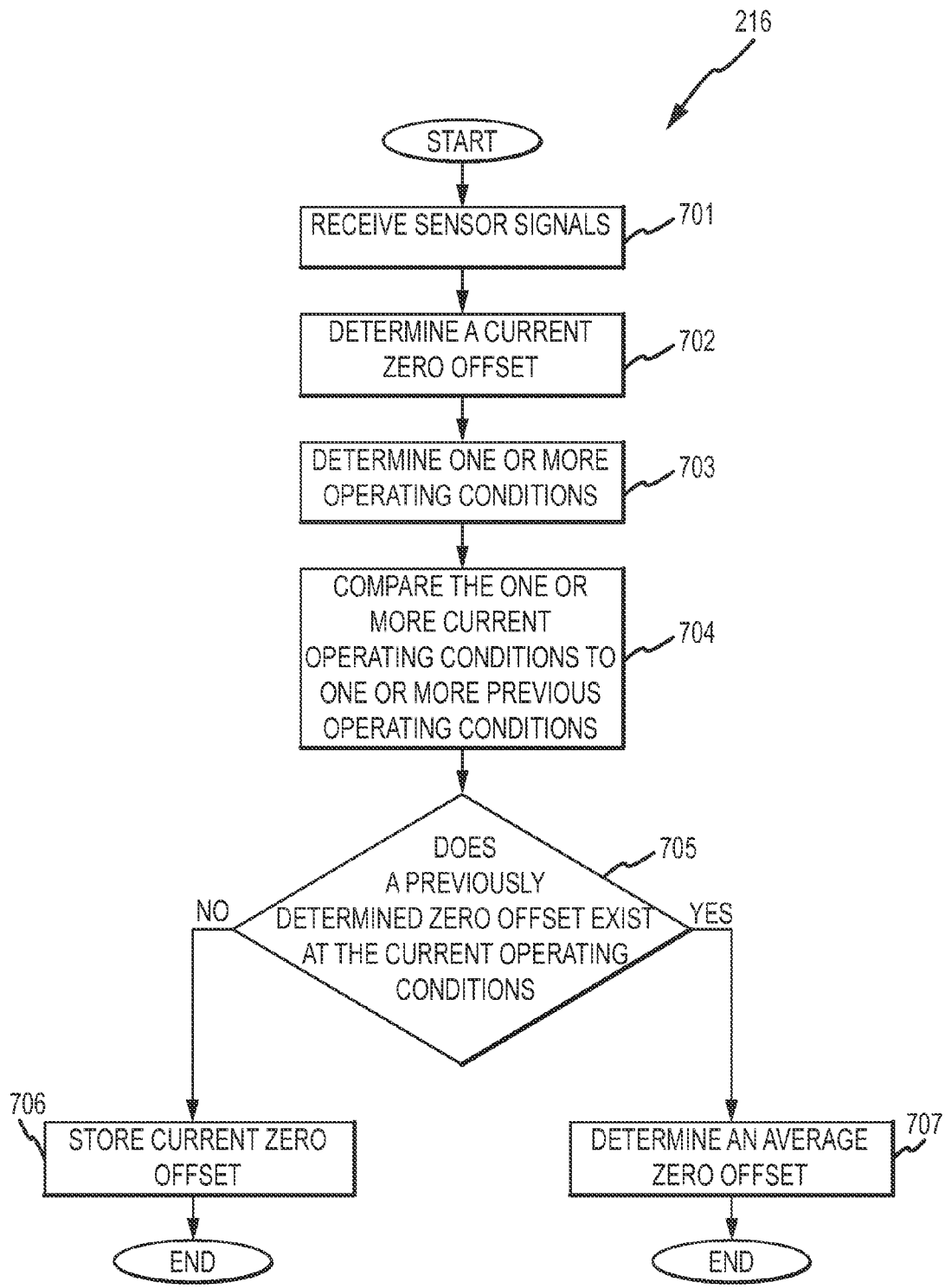
FIG. 7 shows a zero offset determination routine according to another embodiment of the invention.

FIG. 7 shows a zero offset determination routine 216 according to an embodiment of the invention. The meter electronics 20 can automatically update the zero offset of a particular vibrating flow meter using the zero offset determination routine 216.

In step 701, sensor signals can be received. The sensor signals may be received as described above. The sensor signals may be received from only one vibrating flow meter, such as the vibrating flow meter 10, for example. In other embodiments, when the zero offset determination routine 216 is implemented with multiple vibrating flow meters, the sensor signals may be received from more than one vibrating flow meter. According to an embodiment of the invention, the sensor signals can be received from a vibrating flow meter having a previously determined offset correlation. The previously determined offset correlation may correspond to a differential zero offset, such as the offset correlation 214. According to another embodiment, the previously determined offset correlation may correspond to an absolute zero offset, such as for a single vibrating flow meter, for example. The absolute zero offset correlation may be determined in a similar manner to the differential offset determination routine 213, except that the absolute zero offset would need to be determined when the flow rate was substantially zero. However, the operating conditions, such as temperature could be determined and a correlation could be generated as described above.

In step 702, a current zero offset can be generated. The current zero offset may be generated using the sensor signals received in step 701, for example. The current zero offset may comprise an absolute zero offset or alternatively, a differential zero offset.

In step 703, one or more current operating conditions can be determined.

In step 704, the one or more current operating conditions can be compared to one or more previous operating conditions of the previously determined offset correlation between zero offset and operating conditions, such as the offset correlation 214, for example.

In step 705, the zero offset determination routine 216 determines if a previously determined zero offset exists at the current operating conditions. According to an embodiment of the invention, if the offset correlation does not include a zero offset for the one or more determined operating conditions, the routine 216 proceeds to step 706 where the current zero offset generated in step 702 can be stored as a new value in the zero offset correlation 214 along with the associated determined operating conditions. According to another embodiment of the invention, if the offset correlation includes a previously determined zero offset corresponding to the one or more determined operating conditions, the zero offset determination routine 216 can proceed to step 707. The previously determined zero offset may comprise a "best guest" zero offset, which may be programmed by a manufacturer, for example.

In step 707, an average zero offset can be determined. According to an embodiment of the invention, the current zero offset and the previously determined zero offset can be assigned a weighting factor and the weighted zero offset can comprise a weighted average of the current and previously determined zero offsets. The weighting factors assigned to the current and previously determined zero offsets may be time-based, for example. According to an embodiment of the invention, newer determined zero offsets are given greater weight than older determined zero offsets. Therefore, the current zero offset would likely be given more weight than the previously determined zero offset. For example, the current zero offset may be given twice as much weight as the previously determined zero offset when determining the average zero offset. Likewise, the particular weight given to the current zero offset may be based on the relative lapse in time between the current and previously determined zero offsets. The weighting factor can be utilized for generating a compensated zero offset during normal operation, such as during the differential zero determination routine 215, for example. The weighted zero offset may be stored with the offset correlation 214, for example. Therefore, during the differential zero determination routine 215, the zero offset values stored with the offset correlation 214 may comprise weighted zero offset values.

By utilizing a weighted average in order to update the zero offset, the present invention can not only continuously adapt to changing conditions, but also reduce significant errors produced by extreme changes in a single zero offset that may be attributable to factors other than the measured operating conditions.

According to an embodiment of the invention, the meter electronics 20 can use the updated values for the zero offset when comparing one or more measured operating conditions to the offset correlation 214. According to an embodiment of the invention, each time a zero offset determination routine, such as the differential offset determination routine 213 or the zero offset determination routine 216 is performed, the offset correlation 214 can be stored to a database. With each successive offset correlation that is generated, the database grows.

It should also be appreciated that the compensated zero offset may be determined automatically by the meter electronics 20, for example. This avoids the need for a user/operator to manually enter a compensated zero offset based on the previously generated correlation.

The present invention as described above provides various methods to determine and compensate for changes that may occur in the zero offset of a vibrating flow meter, such as a Coriolis flow meter. Furthermore, the present invention provides a method to compensate for a change in the flow calibration factor that may occur over time, or more simply, to remove a constant difference in flow calibration factors between two or more meters to as to maximize differential measurement performance. Although the various embodiments described above are directed towards flow meters, specifically Coriolis flow meters, it should be appreciated that the present invention should not be limited to Coriolis flow meters, but rather the methods described herein may be utilized with other types of flow meters, or other vibrating sensors that lack some of the measurement capabilities of Coriolis flow meters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

We claim:

1. A method for operating a vibrating flow meter system, comprising the steps of:
   receiving a first sensor signal from a first vibrating flow meter and at least a second sensor signal from a second vibrating flow meter;
   generating a first flow rate from the first sensor signal and generating a second flow rate from the second sensor signal; and determining a differential zero offset of the first vibrating flow meter based on the first and second flow rates.

2. The method of claim 1, further comprising the steps of:
receiving a subsequent first sensor signal from the first vibrating flow meter; and
generating a compensated flow rate using the subsequently received first sensor signal and the determined differential zero offset.

3. The method of claim 1, further comprising the steps of:
determining one or more operating conditions of the first vibrating flow meter; and
generating a correlation between the differential zero offset and the one or more operating conditions of the first vibrating flow meter.

4. The method of claim 3, further comprising the steps of:
receiving a subsequent first sensor signal from the first vibrating flow meter; and
determining a third flow rate using the generated correlation between the differential zero offset and the one or more operating conditions.

5. The method of claim 1, wherein the step of receiving the first and second sensor signals comprises receiving the first and second sensor signals from the first and second vibrating flow meters at a first flow rate, and wherein the method further comprises the steps of:
determining a first time delay based on the first sensor signal received from the first vibrating flow meter at the first flow rate;
receiving subsequent first and second sensor signals from the first and second vibrating flow meters at a second flow rate;
determining a second time delay based on the subsequently received first sensor signal received from the first vibrating flow meter at the second flow rate;
determining the first and second flow rates based on the second and subsequently received second sensor signals received from the second vibrating flow meter; and
determining a flow calibration factor for the first vibrating flow meter based on the determined first and second flow rates, the first and second time delays, and the differential zero offset.

6. The method of claim 1, further comprising the steps of:
determining a fluid density; and
generating a correlation between the differential zero offset, one or more operating conditions, and the fluid density.

7. A method of operating a vibrating flow meter system having a previously determined offset correlation between a differential zero offset and one or more operating conditions, comprising the steps of:
receiving a first sensor signal from at least a first vibrating flow meter;
determining one or more current operating conditions of the first vibrating flow meter;
comparing the one or more current operating conditions to one or more previous operating conditions of the offset correlation; and
determining a current differential zero offset for the first vibrating flow meter based on the one or more current operating conditions and the previously determined offset correlation.

8. The method of claim 7, further comprising the step of:
determining a compensated flow rate based on the first sensor signal and the current differential zero offset.

9. The method of claim 7, wherein the previously determined correlation comprises a correlation between the zero offset and one or more operating conditions for one or more fluid densities.

10. A meter electronics (20) for a vibrating flow meter system (300), including a first vibrating flow meter (10), a second vibrating flow meter (305), and a processing system (203) configured to:
receive a first sensor signal (210) from the first vibrating flow meter (10) and a second sensor signal from the second vibrating flow meter (305);
generate a first flow rate from the first sensor signal and generate a second flow rate from the second sensor signal; and
determine a differential zero offset for the first vibrating flow meter (10) based on the first and second flow rates.

11. The meter electronics (20) of claim 10, wherein the processing system (203) is further configured to:
receive a subsequent first sensor signal from the first vibrating flow meter; and
generate a compensated flow rate using the subsequently received first sensor signal and the determined differential zero offset.

12. The meter electronics (20) of claim 10, wherein the processing system (203) is further configured to:
determine one or more operating conditions of the first vibrating flow meter (10); and
generate a correlation between the differential zero offset and the one or more operating conditions of the first vibrating flow meter (10).

13. The meter electronics (20) of claim 12, wherein the processing system (203) is further configured to:
receive a subsequent first sensor signal from the first vibrating flow meter (10); and
determine a third flow rate using the generated correlation between the differential zero offset and the one or more operating conditions.

14. The meter electronics (20) of claim 10, wherein the first and second sensor signals are received at a first flow rate and wherein the processing system (203) is further configured to:
determine a first time delay based on the first sensor signals (210) received from the first vibrating flow meter (10) at the first flow rate;
receive subsequent first and second sensor signals from the first and second vibrating flow meters (10, 305) at a second flow rate;
determine a second time delay based on the subsequently received first sensor signals received from the first vibrating flow meter (10) at the second flow rate;
determine the first and second flow rates based on the second and the subsequently received second sensor signals received from the second vibrating flow meter (305); and
determine a flow calibration factor for the first vibrating flow meter (10) based on the determined first and second flow rates, the first and second time delays, and the differential zero offset.

15. The meter electronics (20) of claim 10, wherein the processing system (203) is further configured to:
determine a fluid density; and
generate a correlation between the differential zero offset, one or more operating conditions, and the fluid density.

16. A meter electronics (20) for a vibrating flow meter system (300) having a previously determined offset correlation between a differential zero offset and one or more operating conditions, the vibrating system (300) including a first vibrating flow meter (10), a second vibrating flow meter (305), and a processing system (203) configured to:
- receive a first sensor signal (210) from the first vibrating flow meter (10);
- determine one or more current operating conditions of the first vibrating flow meter (10);
- compare the one or more current operating conditions to one or more previous operating conditions of the offset correlation; and
- determine a current differential zero offset for the first vibrating flow meter (10) based on the one or more current operating conditions and the previously determined offset correlation (214).

17. The meter electronics (20) of claim 16, wherein the processing system (203) is further configured to:
- determine a compensated flow rate based on the first sensor signal and the current differential zero offset.

18. The meter electronics (20) of claim 16, wherein the previously determined correlation (214) comprises a correlation between the zero offset and one or more operating conditions for one or more fluid densities.

* * * * *